United States Patent
Mu et al.

(10) Patent No.: US 10,237,501 B2
(45) Date of Patent: Mar. 19, 2019

(54) AUTOFOCUS SYSTEM FOR CMOS IMAGING SENSORS

(71) Applicant: BAE Systems Imaging Solutions Inc., San Jose, CA (US)

(72) Inventors: Bo Mu, San Jose, CA (US); Alberto M. Magnani, Danville, CA (US)

(73) Assignee: BAE Systems Imaging Solutions Inc., San Jose, CA (US)

( * ) Notice: Subject to any disclaimer, the term of this patent is extended or adjusted under 35 U.S.C. 154(b) by 0 days.

(21) Appl. No.: 15/554,438

(22) PCT Filed: Feb. 28, 2017

(86) PCT No.: PCT/US2017/020026
§ 371 (c)(1),
(2) Date: Aug. 30, 2017

(87) PCT Pub. No.: WO2018/160172
PCT Pub. Date: Sep. 7, 2018

(65) Prior Publication Data
US 2018/0249106 A1    Aug. 30, 2018

(51) Int. Cl.
*H04N 5/369* (2011.01)
*H04N 5/232* (2006.01)
*G02B 7/38* (2006.01)

(52) U.S. Cl.
CPC ............. *H04N 5/3696* (2013.01); *G02B 7/38* (2013.01); *H04N 5/23212* (2013.01)

(58) Field of Classification Search
CPC ............. H04N 5/3696; H04N 5/23212; H04N 5/532122; H04N 5/36961; G02B 7/38
(Continued)

(56) References Cited

U.S. PATENT DOCUMENTS

| | | | | |
|---|---|---|---|---|
| 8,582,019 B2 * | 11/2013 | Fujii | ......................... | G02B 7/34 |
| | | | | 348/349 |
| 2002/0121652 A1 * | 9/2002 | Yamasaki | ................ | G02B 7/34 |
| | | | | 257/222 |

(Continued)

FOREIGN PATENT DOCUMENTS

KR    20160008385    1/2016

OTHER PUBLICATIONS

International Search Report, PCT/US17/20026, dated May 25, 2017, 72 pages.

(Continued)

*Primary Examiner* — Nhan T Tran
(74) *Attorney, Agent, or Firm* — Calvin B. Ward; Scott J. Asmus

(57) ABSTRACT

The present invention includes an imaging apparatus that includes a two dimensional array of pixel sensors. Each pixel sensor includes a main photodiode, an autofocus photodiode, and a microlens that concentrates light onto the main photodiode and the autofocus photodiode. The imaging array of pixel sensors includes first and second autofocus arrays of pixel sensors, the pixel sensors in the first autofocus array of pixel sensors having the autofocus photodiodes positioned such that each autofocus photodiode receives light preferentially from one half of the microlens in that pixel sensor, and the pixel sensors in the second autofocus array of pixel sensors having each autofocus photodiode positioned such that each autofocus photodiode receives light preferentially from the other half of the microlens in that pixel sensor. The autofocus photodiodes can be constructed from the parasitic photodiodes associated with the floating diffusion nodes in each pixel sensor or conventional photodiodes.

14 Claims, 15 Drawing Sheets

(58) Field of Classification Search
USPC .................................... 348/345, 349, 354
See application file for complete search history.

(56) References Cited

U.S. PATENT DOCUMENTS

| | | | |
|---|---|---|---|
| 2013/0015545 A1 | 1/2013 | Toumiya et al. | |
| 2013/0107086 A1* | 5/2013 | Nagano | H01L 27/14607 348/273 |
| 2013/0235253 A1* | 9/2013 | Onuki | H04N 5/3696 348/349 |
| 2015/0122974 A1* | 5/2015 | Fowler | H01L 27/14656 250/208.1 |
| 2015/0256778 A1* | 9/2015 | Kusaka | G03B 13/36 348/302 |
| 2016/0156836 A1* | 6/2016 | Aoki | G02B 7/34 348/345 |
| 2016/0198109 A1* | 7/2016 | Ishii | H04N 5/378 348/302 |
| 2017/0019584 A1* | 1/2017 | Ham | H04N 5/23212 |
| 2017/0094210 A1 | 3/2017 | Galor Gluskin | |
| 2018/0234618 A1* | 8/2018 | Kawarada | H04N 5/23212 |

OTHER PUBLICATIONS

Chipworks, Inside the iPhone 6 and iPhone 6 Plus (Part 3), Published on Oct. 2, 2014, retrieved from https://www.chipworks.com/about-chipworks/overview/blog/inside-iphone-6-and-iphone-6-plus-part-3, Dec. 7, 2018, United States.

M Alarcon, R. Fontaine, D. James, R. Krishnamurthy, J. Morrison, D. Yang, C. Young, Chipworks, Inside Samsung Galaxy S5, retrieved from https://www.techinsights.com/about-techinsights/overview/blog/samsung-galaxy-s5-teardown/, Dec. 7, 2018, United States.

Rifan Muazin, Canon Announces Dual Pixel CMOS AF Technology, Image Sensors World Blog, retrieved from http://image-sensors-world-blog.blogspot.com/2013/07/canon-announces-dual-pixel-cmos-af.html, Dec. 7, 2018, United States.

* cited by examiner

AUTOFOCUS SYSTEM FOR CMOS IMAGING SENSORS

BACKGROUND OF THE INVENTION

Automatic focusing systems are widely used in both still and motion picture cameras. Such systems reduce the expertise required of the user. In addition, in motion picture cameras, the time to change the focus as the scene evolves is prohibitive if the distance between the camera and the object of interest is changing rapidly.

In one prior art system, the computer that controls the lens searches for the focal position that maximizes the high spatial frequency content of the image. Since an out-of-focus image is blurred, the spatial frequency spectrum associated with images of scenes that contain sharp edges and other high spatial frequency generating elements has less power in the high frequency portion of the spectrum than an image of the scene when in focus. Accordingly, these schemes iteratively search the focal distance for the focus that generates the image having the highest ratio of high spatial frequency energy to average spatial frequency energy. The time to perform the search presents challenges when this algorithm is applied to a rapidly changing scene that is being captured by a motion picture camera.

A second class of prior art autofocus systems that avoids this search time utilizes a measurement of the phase difference between pixels that view the image through different portions of the camera lens. These schemes utilize a dedicated imaging array that is separate from the imaging array that generates the photograph or special pixel sensors in the array to sense this phase difference. These special autofocus pixels replace the conventional pixels that record the image; hence, the image recorded by the array includes "holes" at the locations corresponding to the autofocus pixels. These holes are filled by interpolating the results from the surrounding pixels.

SUMMARY

The present invention includes an imaging apparatus that includes a two dimensional array of pixel sensors. Each pixel sensor includes a main photodiode, an autofocus photodiode, and a microlens that concentrates light onto the main photodiode and the autofocus photodiode. The imaging array of pixel sensors includes first and second autofocus arrays of pixel sensors, the pixel sensors in the first autofocus array of pixel sensors having the autofocus photodiodes positioned such that each autofocus photodiode receives light preferentially from one half of the microlens in that pixel sensor, and the pixel sensors in the second autofocus array of pixel sensors having each autofocus photodiode positioned such that each autofocus photodiode receives light preferentially from the other half of the microlens in that pixel sensor.

In one aspect of the invention, the autofocus photodiode includes a pinned photodiode and the main photodiode is also a pinned photodiode characterized by a main photodiode area, the main photodiode area being greater than the pinned photodiode area.

In another aspect of the invention, the autofocus photodiode includes a parasitic photodiode associated with a floating diffusion node in each of the pixel sensors.

In another aspect of the invention, the pixel sensors in the first autofocus array of pixel sensors have autofocus photodiodes positioned such that each autofocus photodiode receives more than 80 percent of the light from one half of the microlens in that pixel sensor, and the pixel sensors in the second autofocus array of pixel sensors having autofocus photodiodes positioned such that each autofocus photodiode receives light preferentially from the other half of the microlens in that pixel sensor.

In another aspect of the invention, the pixel sensors in the first autofocus array of pixel sensors having autofocus photodiodes positioned such that each autofocus photodiode receives more than 90 percent of the light from one half of the microlens in that pixel sensor and the pixel sensors in the second autofocus array of pixel sensors having autofocus photodiodes positioned such that each autofocus photodiode receives light preferentially from the other half of the microlens in that pixel sensor.

In another aspect of the invention, the apparatus includes a camera lens that images a scene to be photographed onto the two dimensional array of pixel sensors, and an actuator that moves the camera lens relative to the two-dimensional imaging array in response to an autofocus signal from a controller. The controller is configured to cause the pixel sensors to be exposed to light from a scene to be photographed for an autofocus period of time, to obtain signals from each of the pixel sensors in the first and second arrays indicative of an amount of light received during the autofocus period of time; and to generate the autofocus signal such that a predetermined portion of the scene will be in focus on a predetermined region of the two dimensional array of pixel sensors.

In another aspect of the invention, generating the autofocus signal includes computing a cross-correlation function of signals from the autofocus photodiodes in the first array with a signal from the autofocus photodiodes in the second array.

In another aspect of the invention, the main photodiodes of the pixel sensors in the two-dimensional array of pixel sensors are organized as a uniform array with equal spacing in each of the two dimensions, and wherein the autofocus photodiodes form a non-uniform array. In another aspect of the invention, the first array of autofocus pixel sensors is a mirror image of the second array of autofocus pixel sensors.

In another aspect of the invention, the controller generates a first image of the scene using the main photodiodes in the imaging array including the first and second arrays of pixel sensors.

In another aspect of the invention, the first autofocus array of pixel sensors includes a first linear array of the pixel sensors and the second autofocus array of pixel sensors includes a second linear array of the pixel sensors configured as a mirror image of the first linear array of pixel sensors.

In another aspect of the invention, the pixel sensors comprise a plurality of color filters of different colors, one of the plurality of color filters is disposed under the microlens in each of the plurality of pixel sensors, the first autofocus array is characterized by a first number of color filters of each color contained in the first autofocus array, and the second autofocus array is characterized a second number of color tilters of each color contained in the second autofocus array, the first and second numbers are substantially equal.

In another aspect of the invention, the controller outputs a light intensity measurement determined from the autofocus photodiodes in each of the pixel sensors together with the first image.

DETAILED DESCRIPTION

The present invention is based on two observations. First, each pixel sensor in the imaging array includes a floating diffusion node that can be used for the autofocus measurements without losing any pixels from the imaging array. Second, by varying the position of the floating diffusion node, the autofocus measurement can be made without blocking light from the autofocus pixels to provide the asymmetry needed for a phase autofocus measurement.

To simplify the following discussion, a pixel sensor is defined to be a circuit that converts light incident thereon to an electrical signal having a magnitude that is determined by the amount of light that was incident on that circuit in a period of time, referred to as the exposure. The pixel sensor has a gate that couples that electrical signal to a readout line in response to a signal on a row select line.

A rectangular imaging array is defined to be a plurality of pixel sensors organized as a plurality of rows and columns of pixel sensors. The rectangular array includes a plurality of readout lines and a plurality of row select lines, each pixel sensor being connected to one row select line and one readout line, the electrical signal generated by that pixel being connected to the readout line associated with that pixel in response to a signal on the row select line associated with that pixel sensor.

Figure 1:
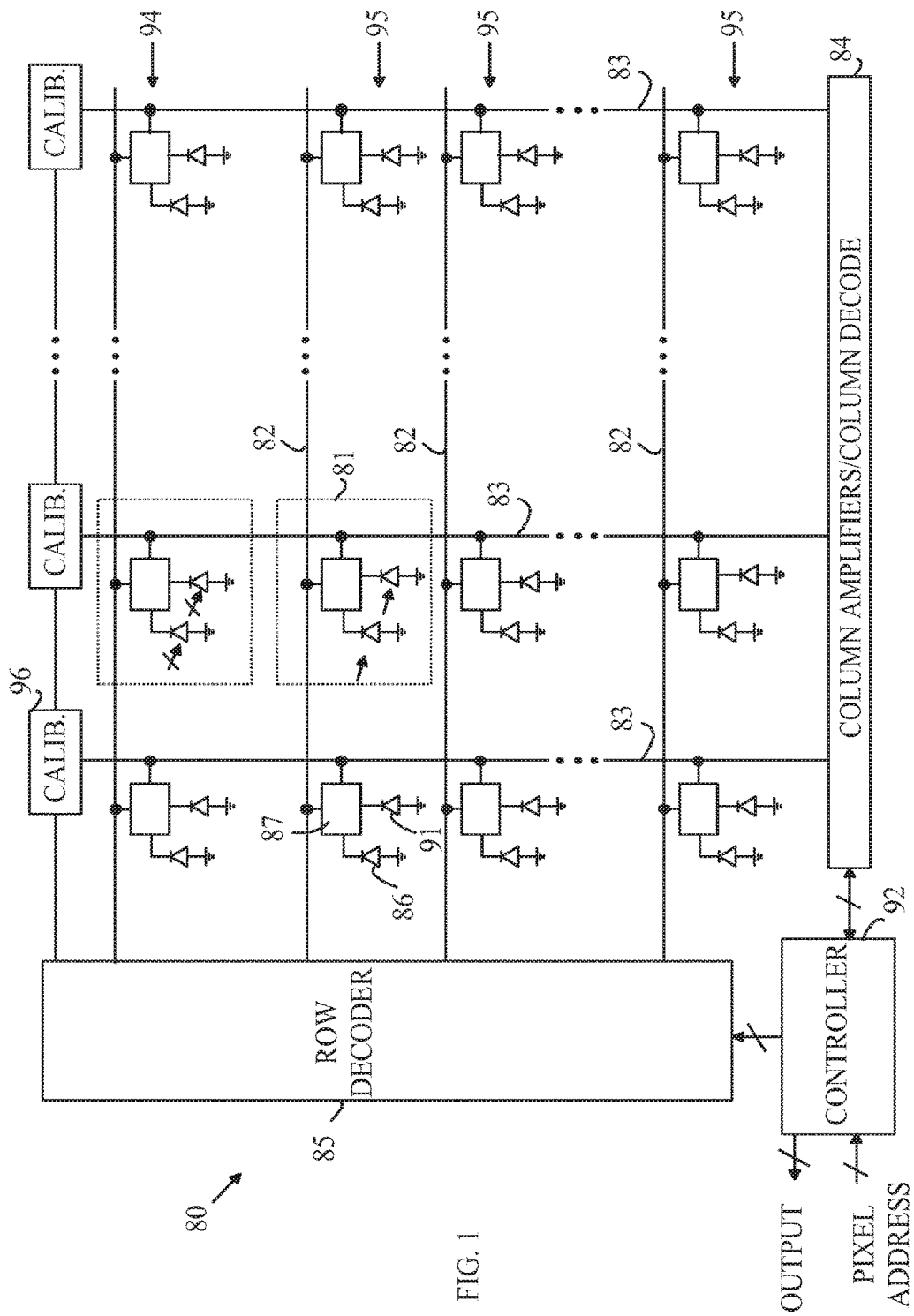
FIG. 1 illustrates a two-dimensional imaging array according to one embodiment of the present invention.

The manner in which the present invention provides its advantages can be more easily understood with reference to FIG. 1, which illustrates a two-dimensional imaging array according to one embodiment of the present invention. Rectangular imaging array 80 includes a pixel sensor 81. Each pixel sensor has a main photodiode 86 and a parasitic photodiode 91. The manner in which the pixel sensor operates will be discussed in more detail below. The reset circuitry and amplification circuitry in each pixel is shown at 87. The pixel sensors are arranged as a plurality of rows and columns. Exemplary rows are shown at 94 and 95. Each pixel sensor in a column is connected to a readout line 83 that is shared by all of the pixel sensors in that column. A calibration source 96 is optionally included on each readout line. Each pixel sensor in a row is connected to a row select line 82 which determines if the pixel sensor in that row is connected to the corresponding readout line.

The operation of rectangular imaging array 80 is controlled by a controller 92 that receives a pixel address to be read out. Controller 92 generates a row select address that is used by row decoder 85 to enable the readout of the pixel sensors on a corresponding row in rectangular imaging array 80. The column amplifiers are included in an array of column amplifiers 84 which execute the readout algorithm, which will be discussed in more detail below. All of the pixel sensors in a given row are read out in parallel; hence there is one column amplification and analog-to-digital converter (ADC) circuit per readout line 83. The column processing circuitry will be discussed in more detail below.

When rectangular imaging array 80 is reset and then exposed to light during an imaging exposure, each photodiode accumulates a charge that depends on the light exposure and the light conversion efficiency of that photodiode. That charge is converted to a voltage by reset and amplification circuitry 87 in that pixel sensor when the row in which the pixel sensor associated with that photodiode is read out. That voltage is coupled to the corresponding readout line 83 and processed by the amplification and ADC circuitry associated with the readout line in question to generate a digital value that represents the amount of light that was incident on the pixel sensor during the imaging exposure.

Figure 2:
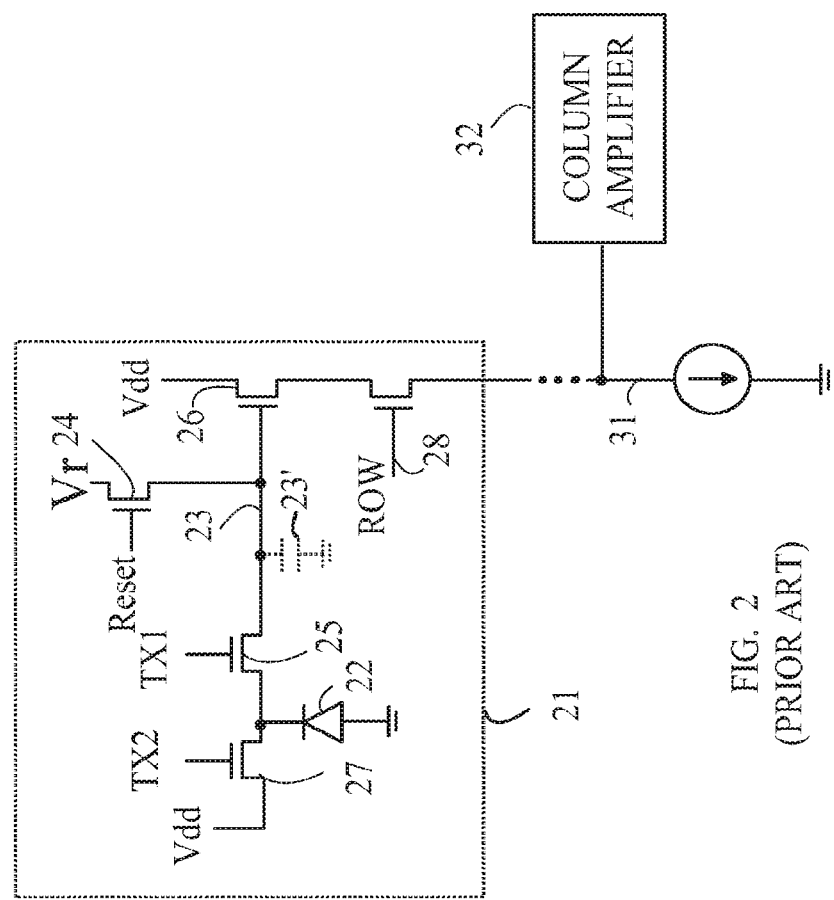
FIG. 2 is a schematic drawing of a typical prior art pixel sensor in one column of pixel sensors in an imaging array.

FIG. 2 is a schematic drawing of a typical prior art pixel sensor in one column of pixel sensors in an imaging array. Pixel sensor 21 includes a photodiode 22 that measures the light intensity at a corresponding pixel in the image. Initially, photodiode 22 is reset by placing gate 25 in a conducting state and connecting floating diffusion node 23 to a reset voltage, Vr. Gate 25 is then closed and photodiode 22 is allowed to accumulate photoelectrons. For the purposes of the present discussion, a floating diffusion node is defined to be an electrical node that is not tied to a power rail, or driven by another circuit. A potential on gate 27 sets the maximum amount of charge that can be accumulated on photodiode 22. If more charge is accumulated than allowed by the potential on gate 27, the excess charge is shunted to ground through gate 27.

After photodiode 22 has been exposed, the charge accumulated in photodiode 22 is typically measured by noting the change in voltage on floating diffusion node 23 when the accumulated charge from photodiode 22 is transferred to floating diffusion node 23. Floating diffusion node 23 is characterized by a capacitance represented by capacitor 23'. In practice, capacitor 23' is charged to a voltage Vr and isolated by pulsing the reset line of gate 24 prior to floating diffusion node 23 being connected to photodiode 22. The charge accumulated on photodiode 22 is transferred to floating diffusion node 23 when gate 25 is opened. The voltage on floating diffusion node 23 is sufficient to remove all of this charge, leaving the voltage on floating diffusion node 23 reduced by an amount that depends on the amount of charge transferred and the capacitance of capacitor 23'. Hence, by measuring the change in voltage on floating diffusion node 23, the amount of charge accumulated during the exposure can be determined. The voltage on floating diffusion node 23 is measured by a column amplifier 32 when the pixel sensor in question is connected to the readout line 31 in response to a signal on bus 28.

The present invention is based on the observation that a pixel of the type discussed above can be modified to include a second parasitic photodiode that is part of the floating diffusion node and has a significant photodiode detection efficiency. Normally, the light conversion efficiency of the parasitic photodiode is minimized by shielding the floating diffusion node from light. However, as pointed out in co-pending U.S. patent application Ser. No. 14/591,873, filed on Jan. 7, 2015, the light conversion efficiency of the parasitic photodiode can be increased by adjusting the spacings of the components in the vicinity of the floating diffusion node.

Figure 3:
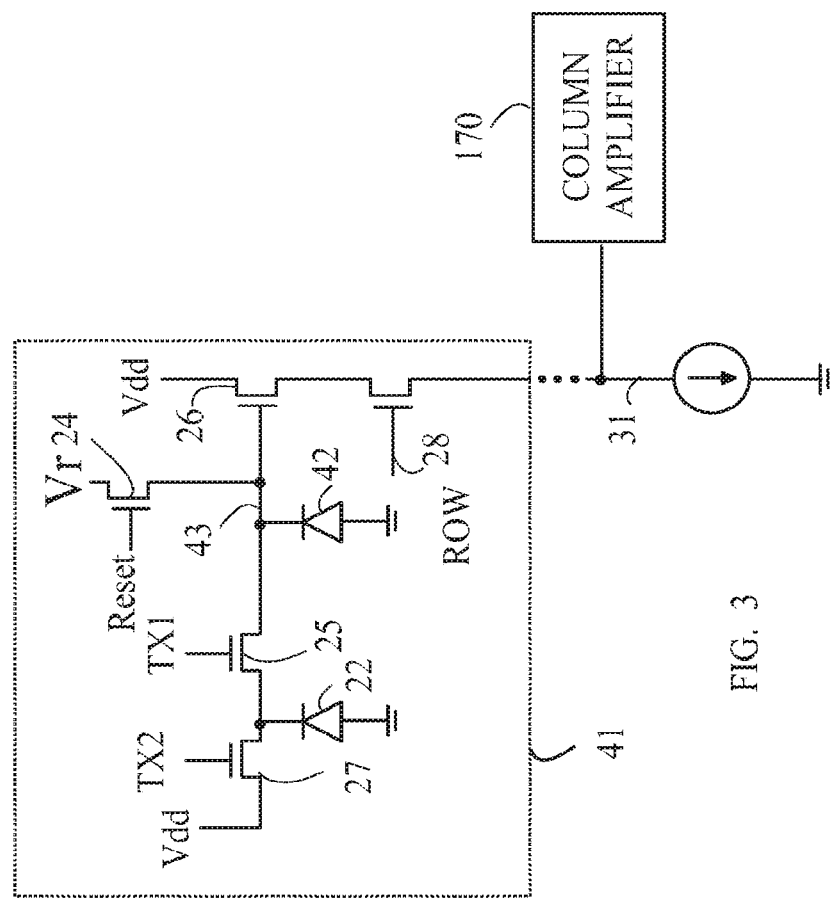
FIG. 3 illustrates a pixel sensor in which the parasitic photodiode is utilized in an image measurement.

To distinguish the parasitic photodiode from photodiode 22, photodiode 22 and photodiodes serving analogous functions will be referred to as the "conventional photodiodes". Refer now to FIG. 3, which illustrates a pixel sensor in which the parasitic photodiode is utilized in an image measurement. To simplify the following discussion, those elements of pixel sensor 41 that serve functions analogous to those discussed above with respect to FIG. 1 have been given the same numeric designations and will not be discussed further unless such discussion is necessary to illustrate a new manner in which those elements are utilized. In general, parasitic photodiode 42 has a detection efficiency that is significantly less than that of photodiode 22. The manner in which the ratio of the photodiode detection efficiencies of the two photodiodes is adjusted is discussed in more detail in co-pending U.S. patent application Ser. No. 14/591,873, filed on Jan. 7, 2015. In one exemplary embodiment, the ratio of the conversion efficiency of the main photodiode to the parasitic photodiode is 30:1. Other embodiments in which this ratio is 20:1 or 15:1 are useful.

The photocharge that accumulates on the parasitic photodiode during an exposure can be determined separately from the photocharge that accumulated on the main photodiode during the exposure. The process may be more easily understood starting from the resetting of the pixel sensor after the last image readout operation has been completed. Initially, main photodiode 22 is reset to Vr and gate 25 is closed. This also leaves floating diffusion node 43 reset to Vr. If a correlated double sampling measurement is to be made, this voltage is measured at the start of the exposure by connecting floating diffusion node 43 to column amplifier 170. Otherwise, a previous voltage measurement for the reset voltage is used. During the image exposure, parasitic photodiode 42 generates photoelectrons that are stored on floating diffusion node 43. These photoelectrons lower the potential on floating diffusion node 43. At the end of the exposure, the voltage on floating diffusion node 43 is measured by connecting the output of source follower 26 to column amplifier 170, and the amount of charge generated by parasitic photodiode 42 is determined to provide a first pixel intensity value. Next, floating diffusion node 43 is again reset to Vr and the potential on floating diffusion node 43 is measured by connecting the output of source follower 26 to column amplifier 170. Gate 25 is then placed in the conducting state and the photoelectrons accumulated by main photodiode 22 are transferred to floating diffusion node 43. The voltage on floating diffusion node 43 is then measured again and used by column amplifier 170 to compute a second pixel intensity value.

Figure 4C:
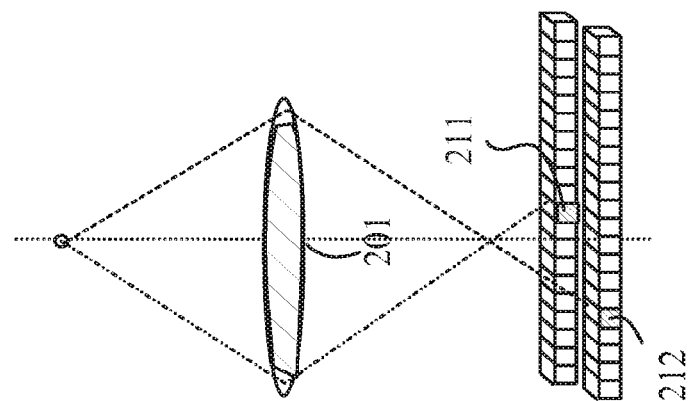
FIGS. 4A-C illustrate the manner in which the distance from the camera lens to the imaging array can be detected.
Figure 4B:
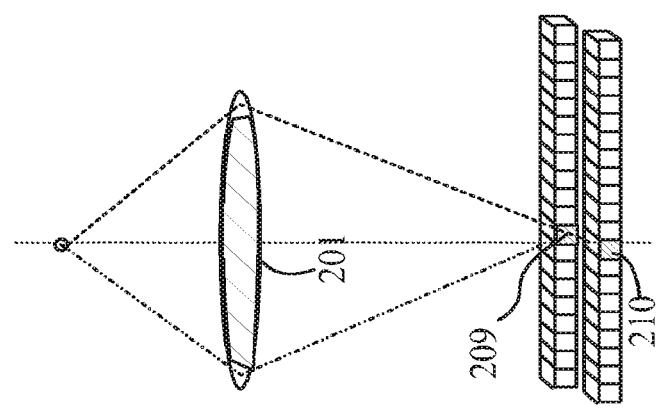
Figure 4A:
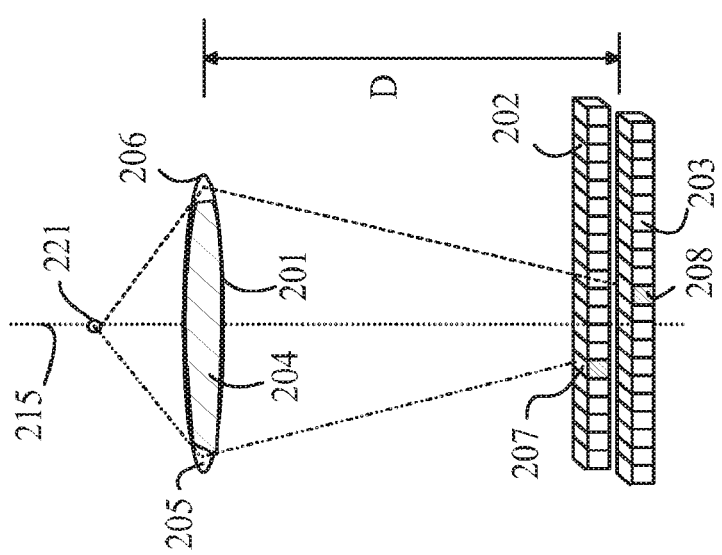

The basic principle of a phase detection autofocus system can be more easily understood with reference to FIGS. 4A-C, which illustrate the manner in which the distance from the camera lens to the imaging array can be detected. Referring to FIG. 4A, consider a point 221 in a scene that is to be captured by the imaging array of a camera through a lens 201. For the purpose of this example, it will be assumed that lens 201 is masked by a mask 204 that blocks all of the light except for light passing through the two edge windows shown at 205 and 206. The light from windows 205 and 206 is imaged onto two linear arrays of pixel sensors shown at 202 and 203. For the purposes of the present discussion, it will be assumed that the pixel sensors in array 202 can only "see" light from window 205, and the pixel sensors in array 203 can only "see" light from window 206. In FIG. 4A, the light from window 205 is detected at pixel sensor 207 in array 202, and the light from window 206 is detected at pixel sensor 208.

The distance from lens 201 to the plane of arrays 202 and 203 is denoted by D. The pixel sensors at which the light is imaged onto the two arrays depends on the distance, D. In the example shown in FIG. 4A, lens 201 images the plane in the scene containing point 221 to a point below the plane of the arrays. Hence, the image of the plane in the scene is out of focus. If the lens is moved toward arrays 202 and 203, the pixel sensors that now detect the light are located toward the middle of arrays 202 and 203. In the case in which lens 201 focuses the light onto the plane of arrays 202 and 203, the location of the pixel sensors receiving the light is in the middle of the array nearest to the optical axis 215 of lens 201. FIG. 4B illustrates the lens is at the proper distance and the pixel sensors receiving the light are shown at 209 and 210. Refer now to FIG. 4C. In this case, lens 201 is too close to the plane of arrays 202 and 203, and the pixel sensors receiving the light are again separated along the length of the arrays as shown at 211 and 212.

Conversely, if one could determine the identity of the pixel sensors receiving light from the two windows in the lens, the distance needed to properly focus point 221 onto the imaging arrays could be determined. If the pixel sensors receiving the light are known, the distance that the lens must be moved to arrive at the correct focus can be determined from a lookup table, and hence, no iteration of the lens distance is needed. Hence, this type of autofocus scheme can perform the autofocus adjustments in a much shorter time than that available with schemes that optimize the high frequency spatial composition of the image.

Adapting this autofocus scheme to imaging arrays in which the arrays of pixel sensors are within the imaging array used to form the image of the scene being photographed presents two challenges. First, the imaging lens is not masked. This problem can be overcome by using pixel sensors that only measure the light transmitted by one half of the camera lens. If the autofocus pixel sensors are separate from the pixel sensors that actually detect the image, pixel sensors that satisfy this constraint can be obtained by masking a microlens that is located over the pixel sensor. However, such schemes effectively remove pixel sensors from the imaging array. The manner in which this is accomplished in the present invention without sacrificing pixel sensors within the imaging array will be discussed in more detail below.

Second, the light projected onto the autofocus linear arrays is not a single point of light, but rather lines from the scene. Accordingly, merely detecting the identity of the pixel sensor receiving the most light in each array does not provide the needed information for determining the proper D. This problem can be overcome by computing an image correlation value that can be mapped to the distance between the lens and the imaging array.

Figure 5:
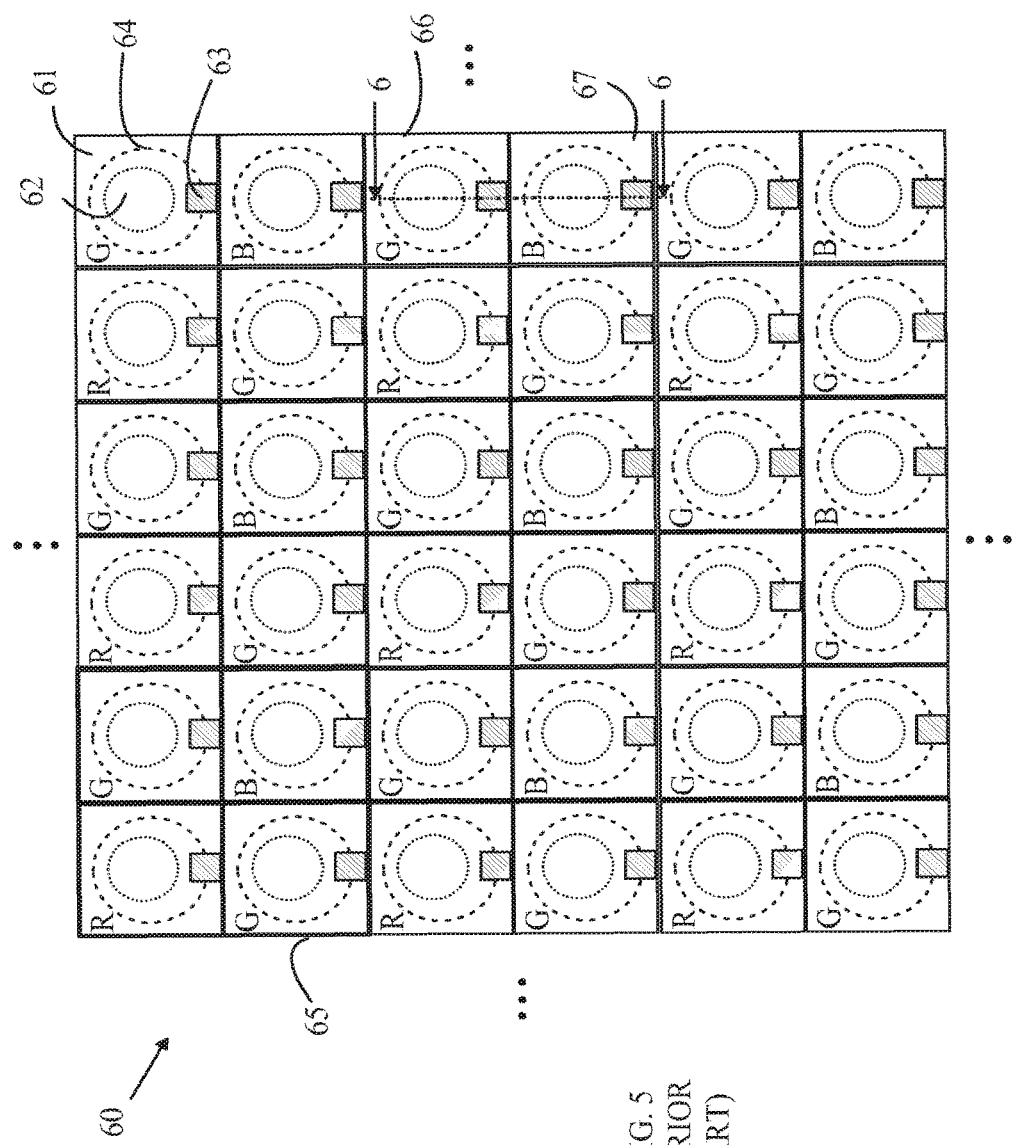
FIG. 5 is a top view of a portion of an embodiment of an imaging array that utilizes the pixels shown in FIG. 3 as taught in the U.S. patent application Ser. No. 14/591,873, filed Jan. 7, 2015.

The manner in which the first challenge is overcome by the present invention can be more easily understood with reference to FIG. 5, which is a top view of a portion of an embodiment of an imaging array 60 that utilizes the pixels shown in FIG. 3 as taught in the above-mentioned US patent application. To simplify the drawing, the various gates and control lines have been omitted from the drawing. The pixel sensors are arranged in a rectangular array. The elements of a typical pixel sensor are labeled at 61. In particular, pixel sensor 61 has a main photodiode 62 and a parasitic photodiode 63. Both of these photodiodes receive light from a microlens 64 that overlies the silicon surface in which the photodiodes are constructed. The pixel sensors are typically arranged in groups of four pixel sensors such as group 65. In an array for utilization in a color camera, each pixel sensor is covered by a color filter. Typically, one pixel sensor is covered by a red filter as denoted by the "R"; one pixel sensor is covered by a blue filter as denoted by the "B", and two pixel sensors are covered by green filters as denoted by the "G". The color processing is not relevant to the present discussion, and hence, will not be discussed here.

The present invention is based on the observation that the parasitic photodiodes associated with floating diffusion nodes can be used to form the linear imaging arrays needed for the autofocus system without altering the main photodiodes, and hence, the pixel losses associated with prior art schemes can be avoided.

Figure 6:
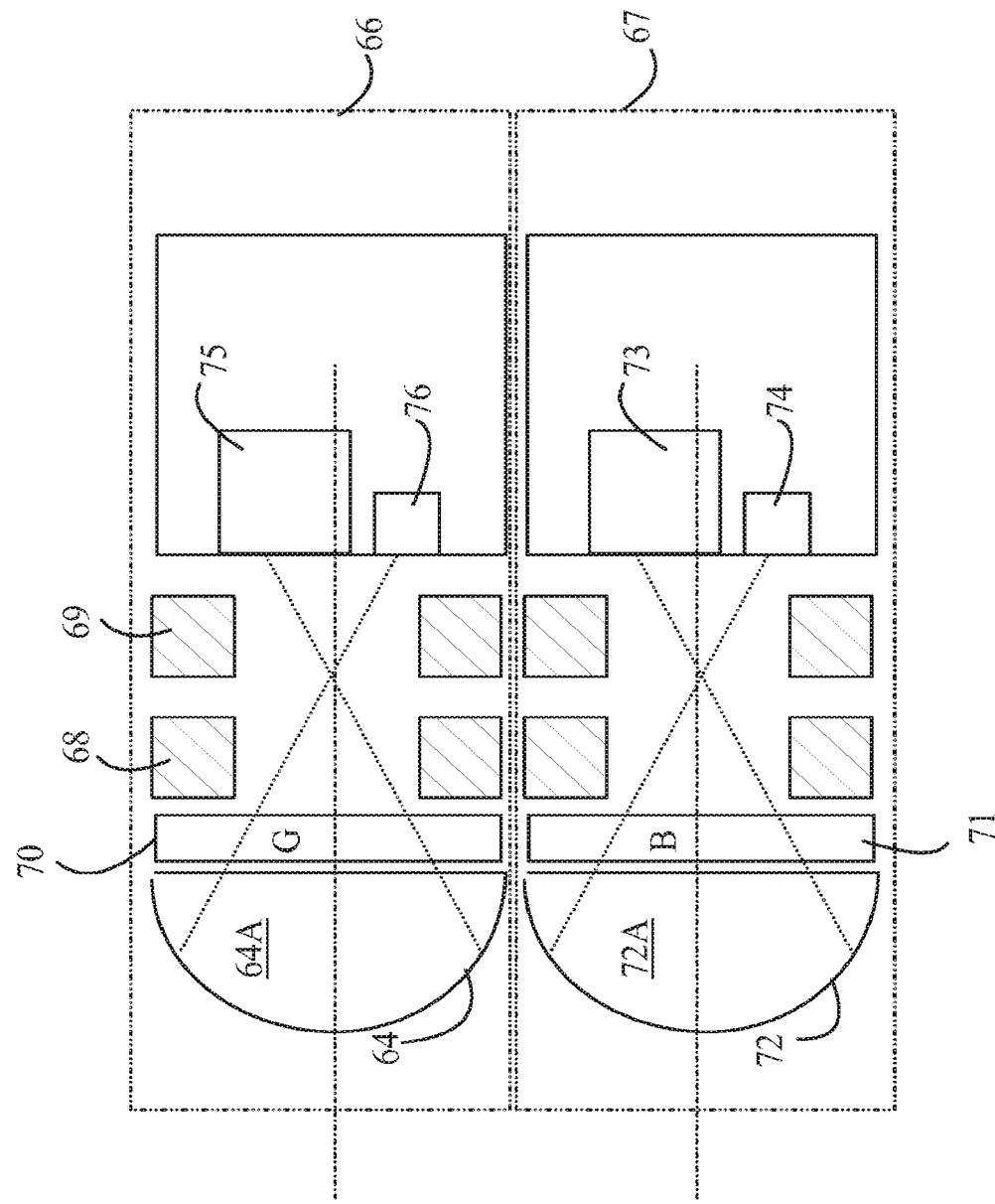
FIG. 6 is a cross-sectional view of pixel sensors 66 and 67 through line 6-6 shown in FIG. 5.

Refer now to FIG. 6, which is a cross-sectional view of pixel sensors 66 and 67 through line 6-6 shown in FIG. 5. Again, the various gates and wiring structures for connecting the gates and the photodiodes to the bit lines have been omitted to simplify the drawing. The main photodiodes are shown at 75 and 73, respectively. The corresponding floating diffusion nodes with their parasitic photodiodes are shown at 74 and 76. The wiring layers over the substrate in which the photodiodes are constructed include a number of patterned metal layers 68 and 69 that form an aperture for limiting the light from the microlenses 64 and 72 that can reach the photodiodes. Color filters 70 and 71 are deposited over the wiring layer and under the microlenses. It should be noted that in this configuration, both of the parasitic photodiodes receive light preferentially from the same half of the microlens, i.e., halves 64A and 72A. Hence, the parasitic photodiodes in this arrangement are not suitable for the autofocus pixel sensors.

Figure 7:
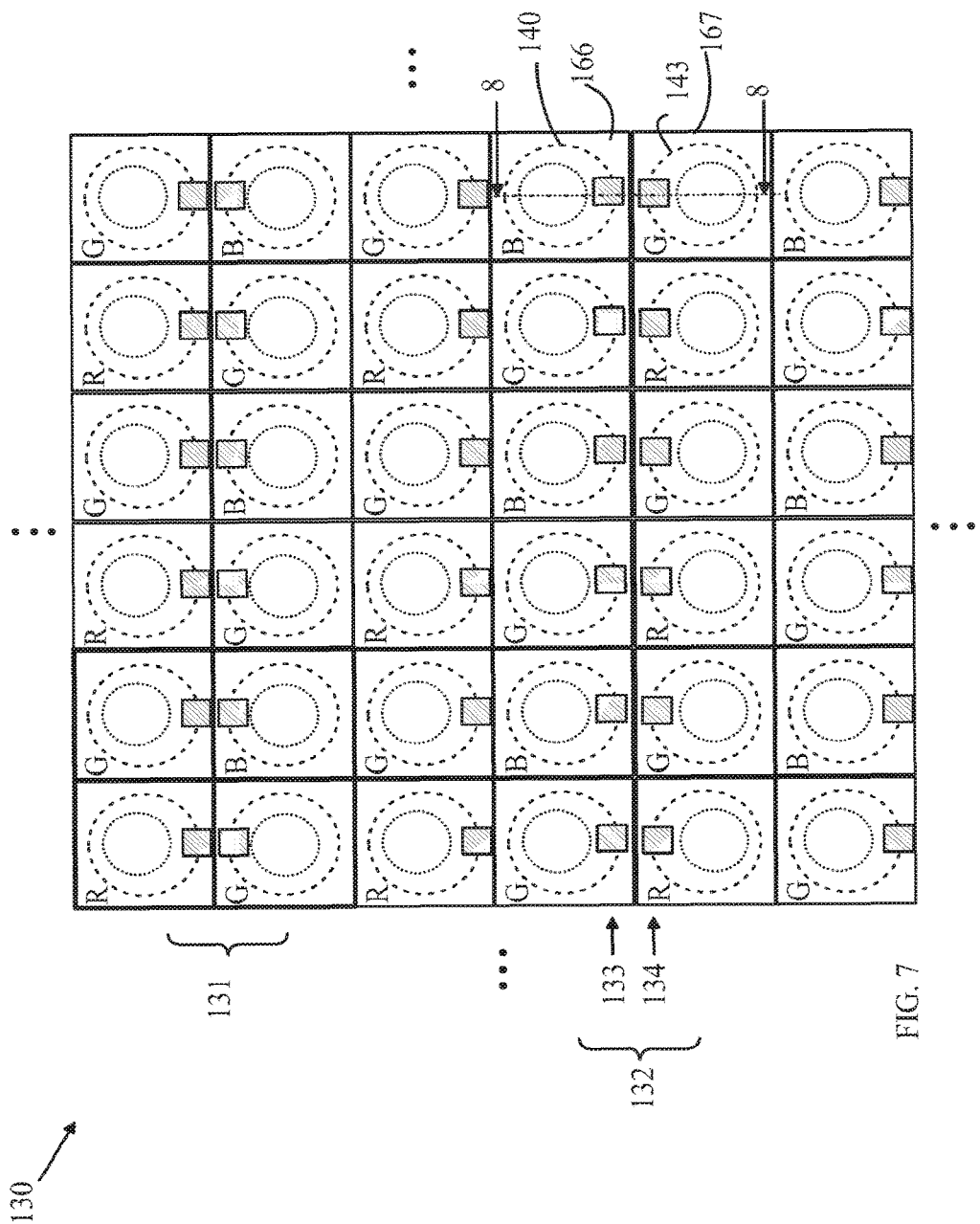
FIG. 7 is a top view of a portion of an imaging array according to one embodiment of the present invention.

Refer now to FIG. 7, which is a top view of a portion of an imaging array according to one embodiment of the present invention. Imaging array 130 differs from imaging array 60 shown in FIG. 5 in that every third row of pixel sensors is the mirror image of the corresponding row in imaging array 60. This creates two arrays of floating diffusion nodes as shown at 131 and 132. As a result, the floating diffusion nodes in one of these rows, e.g. row 133, receive light preferentially from one side of the microlens in the pixel sensor in which the floating diffusion node is located, and the floating diffusion nodes in the other of these rows. e.g. 134, receive light preferentially from the other side of the microlens.

Figure 8:
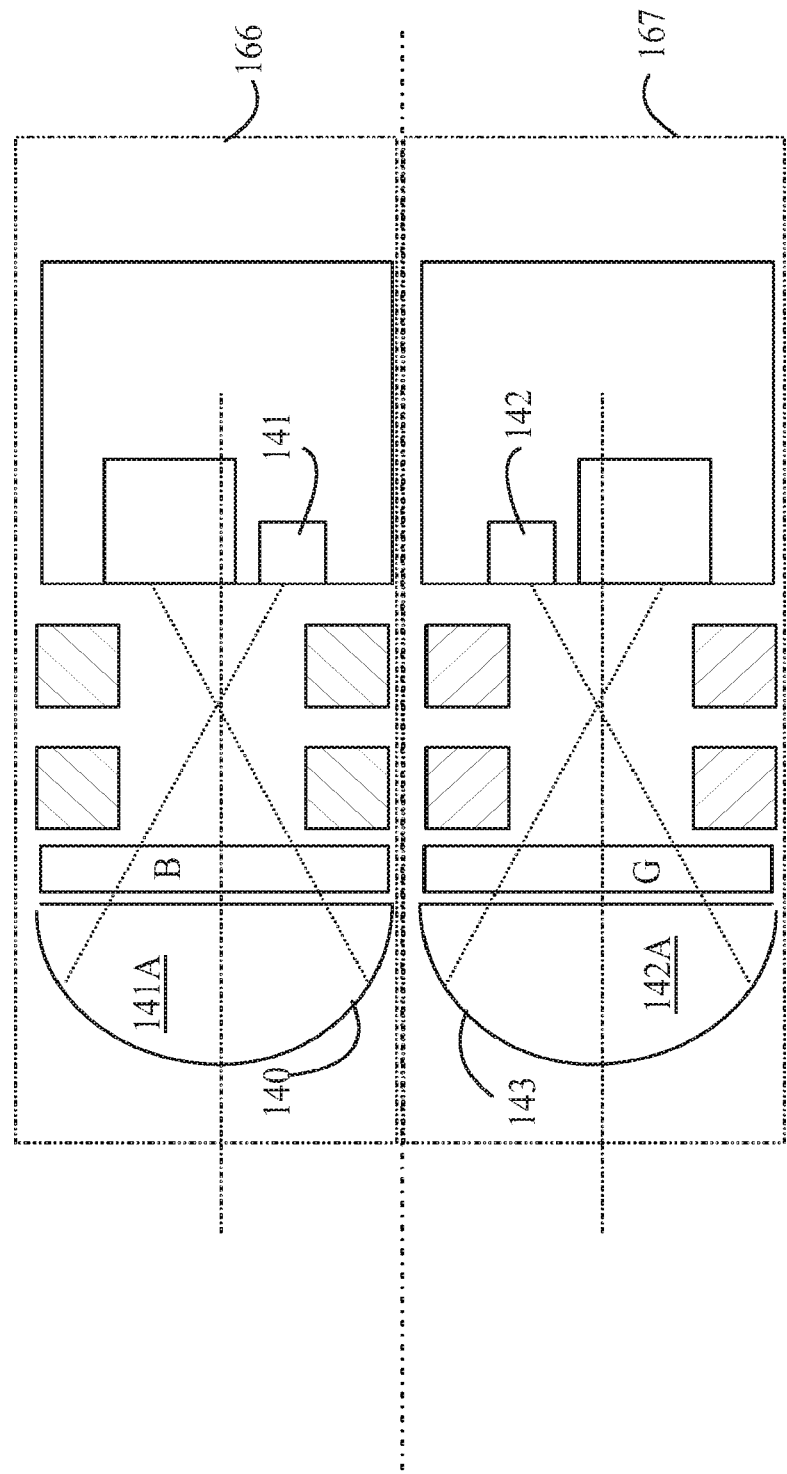
FIG. 8 is a cross-sectional view through line 8-8 shown in FIG. 7.

Refer now to FIG. 8, which is a cross-sectional view through line 8-8 shown in FIG. 7. The floating diffusion node 141 in pixel sensor 166 which is part of row 133 receives light from the half of microlens 140 shown at 141A and receives substantially less light from the other half of microlens 140. In contrast, floating diffusion node 142 in pixel sensor 167 receives light preferentially from the half of microlens 143 shown at 142A. Hence, the floating diffusion nodes in these two rows of pixel sensors can be used as an autofocus sensing array.

To simplify the following discussion, the pixel sensors whose floating diffusion nodes are used for autofocus purposes will be referred to as autofocus pixel sensors. Those autofocus pixel sensors that are in the rows analogous to row 133 will be referred to as the top autofocus pixel sensors. Those autofocus pixel sensors that are in rows in the positions that are analogous to row 134 will be referred to as the bottom autofocus pixel sensors. The labels "top" and "bottom" are merely labels and not intended to denote a position relative to the Earth. In general, the region of the imaging array that generates the image in a particular region of the field of view that is to be maintained in focus will have a two-dimensional array of autofocus pixel sensors that can be used to make the autofocus measurement. This region will be referred to as an autofocus region in the following discussion. Any particular autofocus pixel sensor can be identified by a pair on indices, (I,J), denoting the position of that autofocus pixel sensor in the two-dimensional imaging array. The signals from the floating diffusion nodes in the bottom autofocus pixel sensors will be denoted by B(I,J), and those from the floating diffusion nodes in the top autofocus pixel sensors will be denoted by T(I,J). Since each top autofocus pixel sensor has a corresponding bottom autofocus pixel sensor, the indices are chosen such that B(I,J) is the autofocus pixel sensor corresponding to T(I,J). The autofocus region signals will correspond to some set of the possible A(I,J) and B(I,J) signals.

It should be noted that using the floating diffusion nodes that are part of the imaging array that generates the image of the scene requires that the floating diffusion nodes operate under the color filters. Any distortions introduced by the color filters can be removed by using multiple pairs of lines of the autofocus pixel sensors. Referring again to FIG. 7, the top autofocus pixel sensors in array 131 are covered by red or green tilters, but not blue filters. Similarly the bottom autofocus pixel sensors are covered by blue and green filters, but not red filters. However, the autofocus measurement is made with both arrays 131 and 132, then all possible combinations are obtained. In one aspect of the present invention, the collection of top autofocus pixel sensors used for the autofocus measurement include substantially equal numbers of pixel sensors with red, blue, and green filters. Similarly, the collection of bottom autofocus pixel sensors used for the autofocus measurement includes substantially equal numbers of pixel sensors with red, blue, and green filters. For the purposes of the present discussion, the number of filters of each color that are included will be defined to be substantially equal if the autofocus adjustment obtained from the autocorrelation measurement discussed below is not altered by any lack of equality in the numbers.

As noted above, the camera lens is not masked, and hence, the autofocus pixel sensors receive light from a number of different points in the scene. Accordingly, some form of cross-correlation function must be used to determine the top and bottom pixel locations from which the lens position correction is to be determined.

$$p(u,v) = \frac{\sum_{x,y}(T(x,y) - TA(x,y))(B(x-u, y-v) - BA(x,y))}{\left[\sum_{x,y}(T(x,y) - TA(x,y))\right]\left[\sum_{x,y}(B(x-u, y-v) - BA(x,y))\right]}$$

Here, TA(x,y), and BA(x,y) are the average values of T(x,y) and B(x,y), respectively, over the autofocus pixel sensors. The summations are performed over the set of autofocus pixel sensors that are being used to focus the chosen region of the image. The (u,v) value for which p(u,v) is maximum provides a value that can be used to access the camera lens movement needed to bring the region of the scene being imaged onto the autofocus pixel sensors into focus. In the case of a simple lens, the distance the lens is to move is determined. Alternatively, the focal length of a more complex imaging lens could be altered to bring the image into focus. In this case, the change in focal length would be determined. In one aspect of the invention, the controller stores a focus table that maps this determined (u,v) value to a camera lens movement or focal length change needed to bring the scene into focus.

Figure 9:
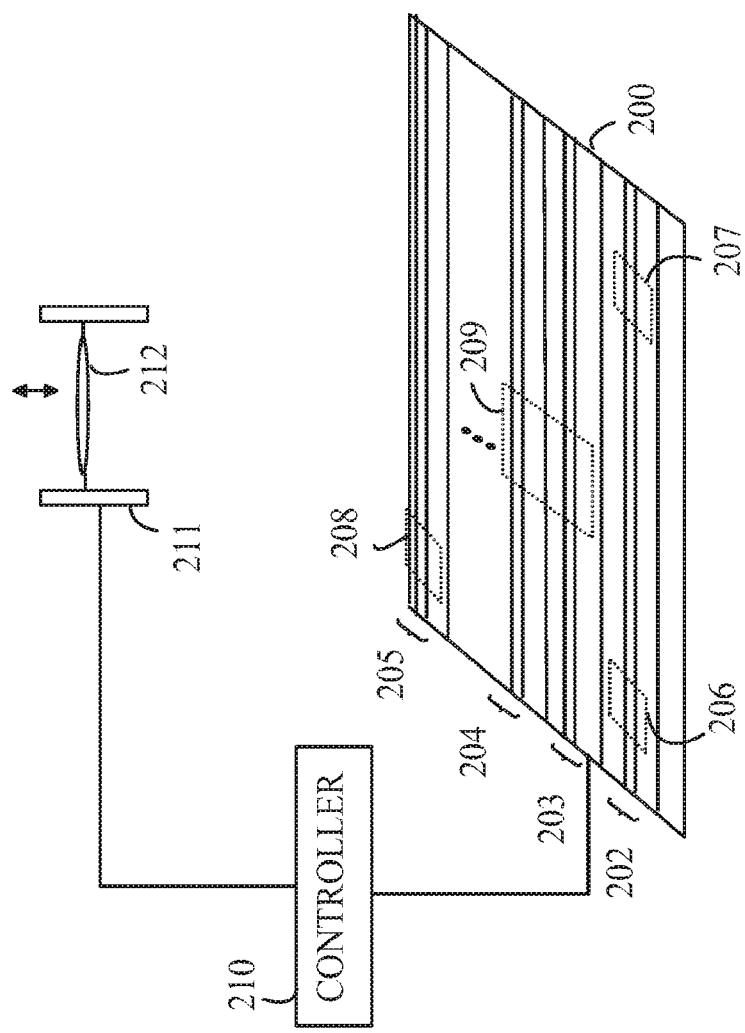
FIG. 9 illustrates an imaging array having multiple autofocus zones.

Typically, the lens is moved such that a particular region of the image is in focus. This is usually a region near the center of the image. In the present invention, autofocus pixel sensors are available over essentially the entire imaging array. Hence, a plurality of regions that can provide autofocus data are present. A region having sufficient autofocus pixel sensors to perform the focal adjustment will be referred to as an autofocus zone in the present discussion. Refer now to FIG. 9, which illustrates an imaging array having multiple autofocus zones. Imaging array 200 is organized as a rectangular array having autofocus pixel sensor arrays on the rows. Essentially, two out of every three rows contain autofocus pixel sensors, as shown at 202-205. An autofocus zone can be as small as a portion of two of the autofocus pixels sensor rows as shown at 206-208, or an autofocus zone can include portions of four or more of the autofocus pixel sensor rows as shown at 209.

In practice, autofocus controller 210 is programmed to use one of the autofocus zones to set the focal properties of lens 212. Autofocus controller 210 can be implemented in the overall camera controller or as a separate controller that communicates with a master camera controller such as 92 shown in FIG. 1. Controller 210 then sends signals to actuator 211 to move lens 212 such that the autofocus zone is in focus. As noted above, the autofocus zone normally used is one near the center of the imaging array. However, the correlation function used to set the lens focus can be computed at a large number of autofocus zones in the imaging array and transmitted with the image that is measured after the autofocus control has brought the autofocus zone of interest into focus. This additional information can be used to provide a measurement of the distance of the corresponding regions of the scene from the region on which the camera is focusing.

In one aspect of the invention, a motion picture sequence of images is acquired by making an autofocus measurement before each frame of the motion picture sequence. Hence, the time that can be devoted to making the autofocus adjustment is limited. The time needed to perform the autofocus adjustment will be referred to as the autofocus time period. This time period includes the time needed to expose the autofocus pixel sensors, the time needed to read out those pixel sensors and perform the correlation computation, and the time needed to move the lens. Typically, there is some region of the imaging array, such as the central region, that is to be kept in focus by the autofocus system. It is advantageous to reduce the autofocus exposure time. The autofocus exposure time depends on the number of autofocus pixel sensors in the region of interest that are used in the autofocus focus computation and the light levels in the scene. If the light levels are low or the autofocus exposure time is too short, the resulting autofocus pixel sensor outputs will have significant amounts of noise. The autofocus exposure computation depends on a correlation measurement such as the p(u,v) computation discussed above. As more pixels are added to that computation, the effects of noise are reduced. Since more than half of the pixel sensors in the array are autofocus pixel sensors, the present invention can reduce the autofocus exposure period and use the outputs from more autofocus pixel sensors to compensate for the increased noise. It should be noted that this is a significant advantage of the present invention over systems that have a small number of dedicated autofocus pixel sensors embedded in the imaging array in place of pixel sensors that record the image. In one exemplary embodiment, the number of autofocus pixel sensors used to determine the correct focal adjustment is greater than 1000. In another exemplary embodiment, the number of autofocus pixel sensors used to determine the correct focal adjustment is less than or equal to 1000.

In one aspect of the invention, the area in the center of the imaging array is used for setting the camera lens distance from the imaging array. However, it should be noted that a "focal map" of the entire scene that is projected onto the imaging array can be computed by repeating the distance computation over small segments of the imaging array at locations throughout the imaging array. Such a map would be useful in constructing a three-dimensional image of the scene. Hence, in one aspect of the invention, the signals from the autofocus pixel sensors used to set the lens distance prior to taking an image are output as a separate image for use in later post-processing of the image.

The above-described US patent application describes a method for extending the range of a pixel sensor by using the floating diffusion node to provide a second light measurement of the light received by the pixel sensor during the imaging exposure. The floating diffusion nodes in that method have light conversion efficiencies that are typically $\frac{1}{30}$th of the light conversion efficiency of the main photodiode, and hence, provide a measurement of the received light when the pixel is subjected to light intensities that cause the main photodiode to saturate. The floating diffusion nodes in the present invention can likewise be used to extend the dynamic range of the pixel sensor.

It should be noted that the main photodiodes and the microlenses in the above-described embodiments form a regular array with equal spacing in both the column and row directions. The floating diffusion nodes are not uniformly distributed over the imaging array, some post imaging processing may be required. For example, the image as seen by the floating diffusion nodes could be re-sampled to provide an image on a uniform grid. The values of this re-sampled floating diffusion node image would then be combined with the corresponding values in the image generated by the main photodiodes to provide the extended light intensity measurements. To perform the post-processing, the image as seen by the floating diffusion nodes must be outputted and saved with the image as seen by the main photodiodes.

In the above-described embodiments, the floating diffusion nodes in the autofocus pixel sensors are positioned such that the floating diffusion nodes receive light from only one side of the microlens. However, embodiments in which the floating diffusion nodes receive light preferentially from one side of the microlens can also be constructed. For example, the floating diffusion nodes are positioned such that 80 percent of the light comes from one side of the microlens and 20 percent of the light received by the floating diffusion node comes from the other side of the microlens. In another exemplary embodiment, the floating diffusion nodes are positioned such that 90 percent of the light comes from one side of the microlens and 10 percent of the light received by the floating diffusion node comes from the other side of the microlens. Using additional autofocus pixel sensors in the autofocus cross-correlation method can compensate for this lack of light separation.

While the autofocus system of the present invention tolerates noise in the autofocus pixel sensors, the floating diffusion nodes in the autofocus pixel sensors must have sufficient light conversion efficiency to measure the light levels in the autofocus region of the imaging sensor. Hence, the light conversion efficiency of the floating diffusion nodes is preferably adjusted to be somewhat higher than ⅟₃₀th of the main photodiode light conversion efficiency discussed above. Mechanisms for adjusting the light conversion efficiency of the floating diffusion nodes are discussed in the above-referenced US patent application, which is hereby incorporated in its entirety by reference. Increasing the light conversion efficiency of the floating diffusion nodes, however, reduces the improvement in the dynamic range that is achievable by utilizing the floating diffusion nodes as a second photodiode during the exposure of the image. In one embodiment, the floating diffusion node light conversion efficiency is set to be greater than ⅟₁₀th of the main photodiode light conversion efficiency. In another embodiment, the floating diffusion node light conversion efficiency is set to be greater than ⅟₃₀th of the main photodiode light conversion efficiency.

The above described embodiments refer to rows and columns of pixel sensors; however, it is to be understood that the rows and columns could be interchanged in other embodiments. In addition, the autofocus pixel sensors could be organized such that columns of floating diffusion nodes form the two linear arrays used for autofocus purposes.

To simplify the following discussion, the photodiodes used in the autofocus adjustment will be referred to as the autofocus photodiodes. In the above-described embodiments the parasitic photodiodes associated with the floating diffusion nodes are the autofocus photodiodes. These embodiments do not increase the area of the pixel sensors, and hence, provide significant advantages. However, the parasitic photodiodes are not pinned photodiodes, and hence, have increased noise relative to the main photodiodes. These noise issues can be reduced by using a separate small pinned photodiode in place of the parasitic photodiode of the floating diffusion node. In such embodiments, the light conversion efficiency of the floating diffusion node would be intentionally reduced as is the case with conventional imaging arrays.

Figure 10:
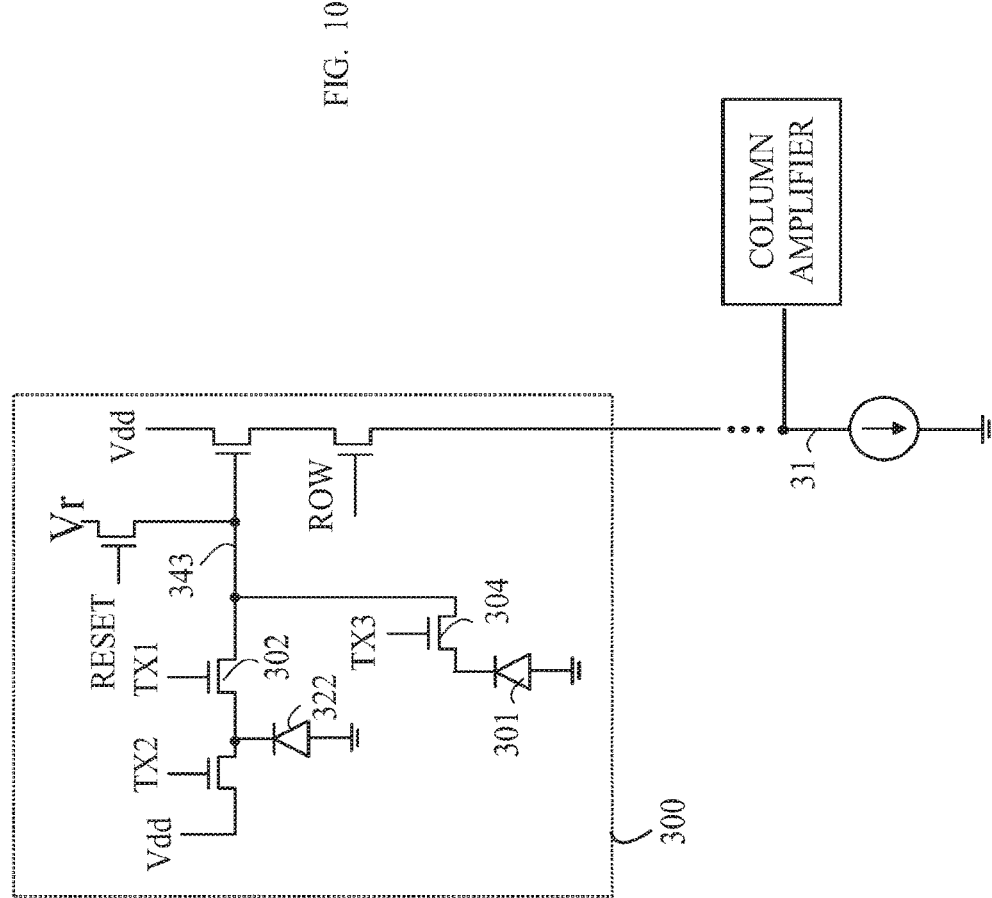
FIG. 10 is a schematic drawing of a pixel sensor having two photodiodes that could be used in two photodiode autofocus embodiments.

Refer now to FIG. 10, which is a schematic drawing of a pixel sensor having two photodiodes that could be used in such two photodiode autofocus embodiments. Pixel sensor 300 includes a main photodiode 322 and an auxiliary photodiode 301. The area of auxiliary photodiode 301 is chosen to be much smaller than that of photodiode 322. For example, auxiliary photodiode 301 has an area less than 0.1 times that of main photodiode 322 in one embodiment. Both photodiodes can be separately connected to floating diffusion node 343 by controlling gates 302 and 304. Since auxiliary photodiode 301 has a much smaller area than main photodiode 322, an anti-blooming gate is not needed. The two photodiodes can be read out in a manner analogous to that discussed above with respect to the parasitic photodiode embodiments. During non-autofocus operations, the photocharge accumulated on auxiliary photodiode 301 can be used to extend the dynamic range of pixel sensor 300 in a manner analogous to that described above. For the purposes of the present discussion, the important aspect of pixel sensor 300 is the relative placement of main photodiode 322 and auxiliary photodiode 301 within pixel sensor 300.

Figure 11:
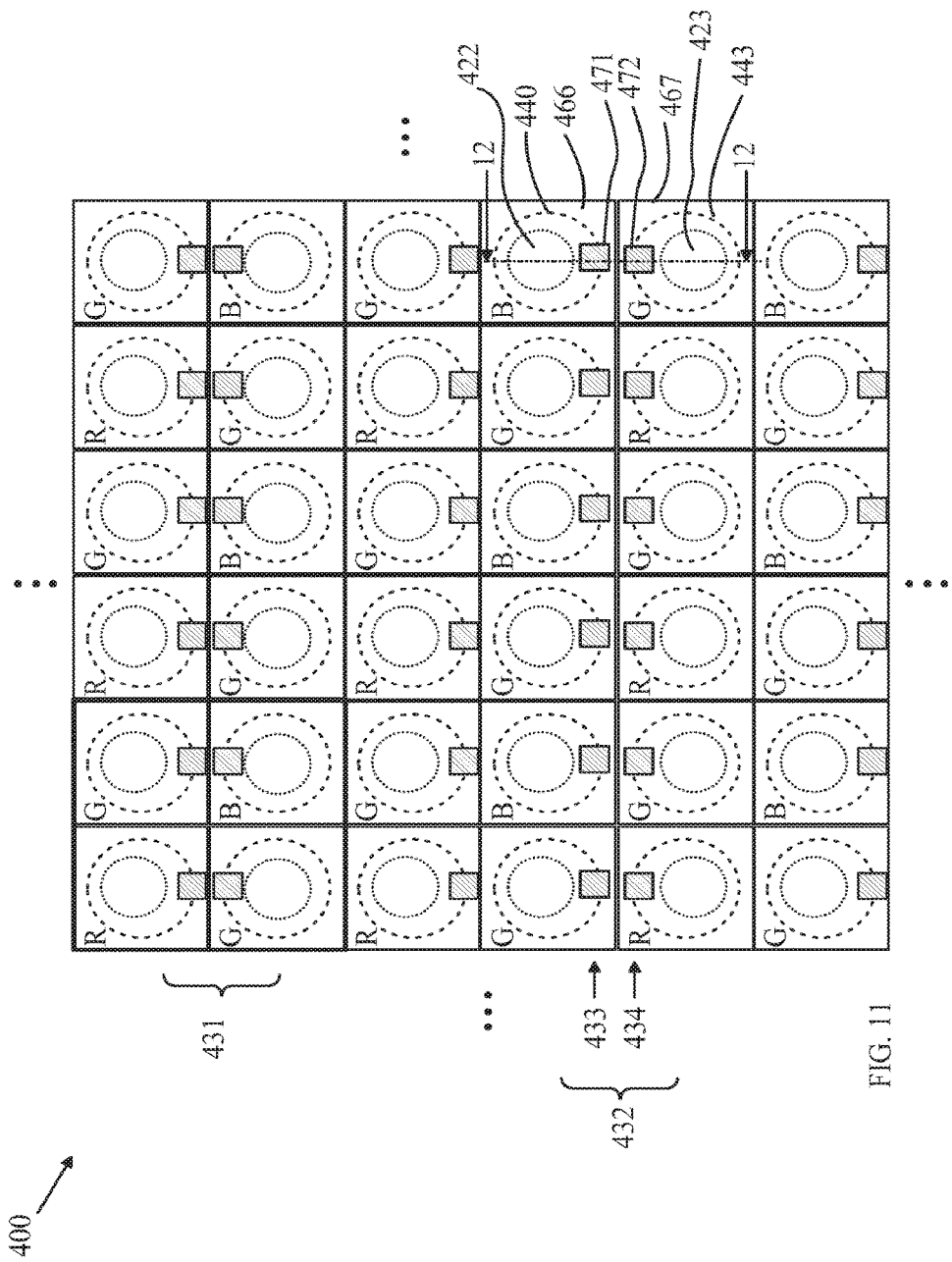
FIG. 11 is a top view of a portion of an imaging array according to one embodiment of the present invention that utilizes the pixel sensor design shown in FIG. 10.

Refer now to FIG. 11, which is a top view of a portion of an imaging array according to one embodiment of the present invention that utilizes the pixel sensor design shown in FIG. 10. Imaging array 400 differs from imaging array 60 shown in FIG. 5 in that every third row of pixel sensors is the mirror image of the corresponding row in imaging array 60. This creates two arrays of auxiliary photodiodes as shown at 431 and 432. As a result, the auxiliary photodiodes in one of these rows, e.g. row 433, receive light preferentially from one side of the microlens in the pixel sensor in which the auxiliary photodiode is located, and the auxiliary photodiodes in the other of these rows, e.g. 434, receive light preferentially from the other side of the microlens.

Figure 12:
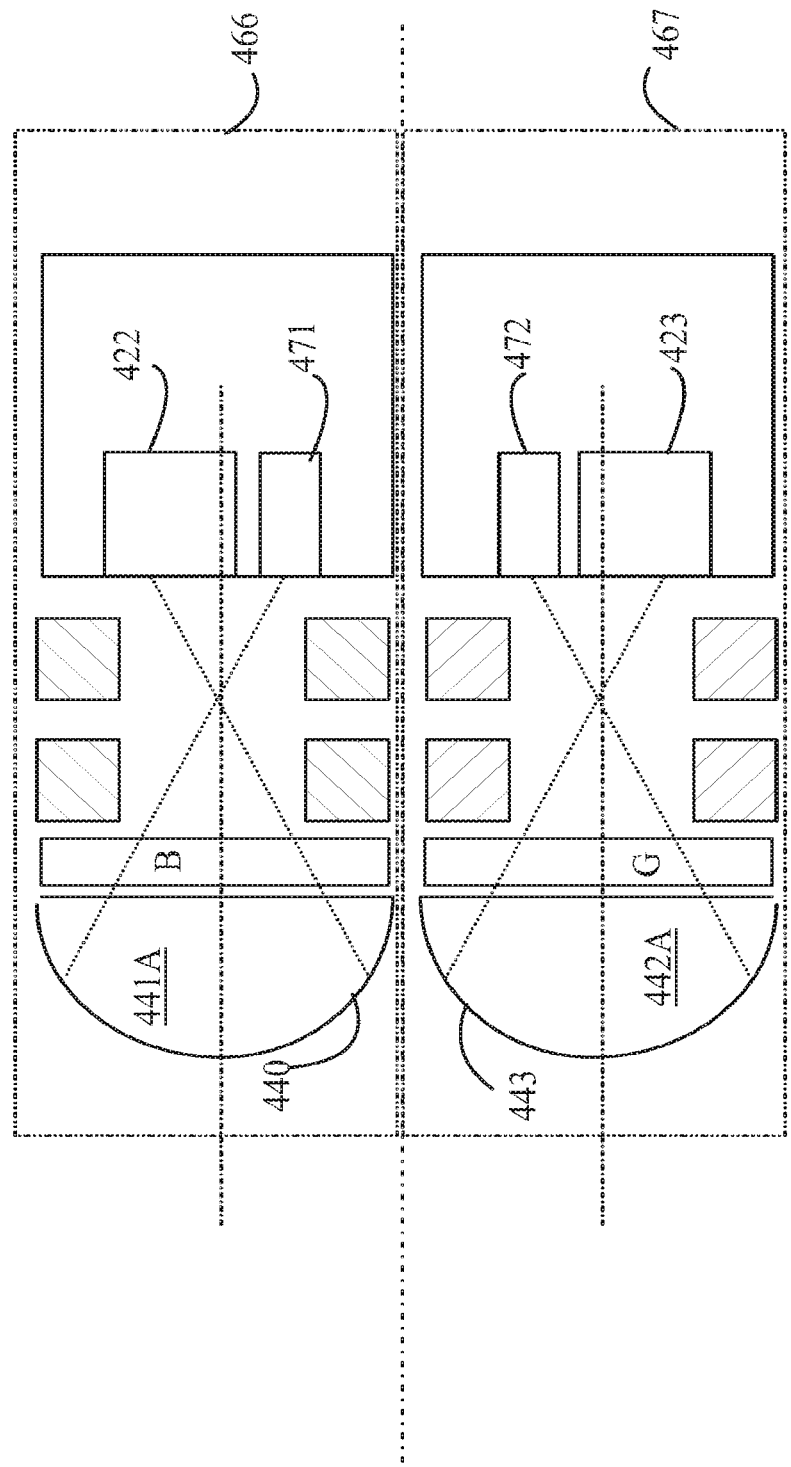
FIG. 12 is a cross-sectional view through line 12-12 shown in FIG. 11.

Refer now to FIG. 12, which is a cross-sectional view through line 12-12 shown in FIG. 11. The auxiliary photodiode 471 in pixel sensor 466 which is part of row 433 receives light from the half of microlens 440 shown at 441A and receives substantially less light from the other half of microlens 440. In contrast, auxiliary photodiode 472 in pixel sensor 467 receives light preferentially from the half of microlens 443 shown at 442A. Hence, the auxiliary photodiodes in these two rows of pixel sensors can be used as an autofocus sensing array. While the auxiliary photodiodes are asymmetrically placed, the main photodiodes 422 and 423 form a regular rectangular array.

The manner in which the auxiliary photodiodes are used in the autofocus procedure is analogous to that described above with respect to the parasitic photodiodes. To simplify the following discussion, the pixel sensors whose auxiliary photodiodes are used for autofocus purposes will again be referred to as autofocus pixel sensors. Those autofocus pixel sensors that are in the rows analogous to row 433 will be referred to as the top autofocus pixel sensors. Those autofocus pixel sensors that are in rows in the positions that are analogous to row 434 will be referred to as the bottom autofocus pixel sensors. The labels "top" and "bottom" are merely labels and not intended to denote a position relative to the Earth. In general, the region of the imaging array that generates the image in a particular region of the field of view that is to be maintained in focus will have a two-dimensional array of autofocus pixel sensors that can be used to make the autofocus measurement. This region will be referred to as an autofocus region in the following discussion. Any particular autofocus pixel sensor can be identified by a pair on indices, (I,J), denoting the position of that autofocus pixel sensor in the two-dimensional imaging array. The signals from the auxiliary photodiodes in the bottom autofocus pixel sensors will be denoted by B(I,J), and those from the auxiliary photodiodes in the top autofocus pixel sensors will be denoted by T(I,J). Since each top autofocus pixel sensor has a corresponding bottom autofocus pixel sensor, the indices are chosen such that B(I,J) is the autofocus pixel sensor corresponding to T(I,J). The autofocus region signals will correspond to some set of the possible A(I,J) and B(I,J) signals. The autofocus adjustment is then carried out as described above with reference to the parasitic photodiodes.

Other layouts of the autofocus photodiodes, either the parasitic photodiode of the floating diffusion node, or a separate photodiode, than those discussed above are also possible.

Figure 13:
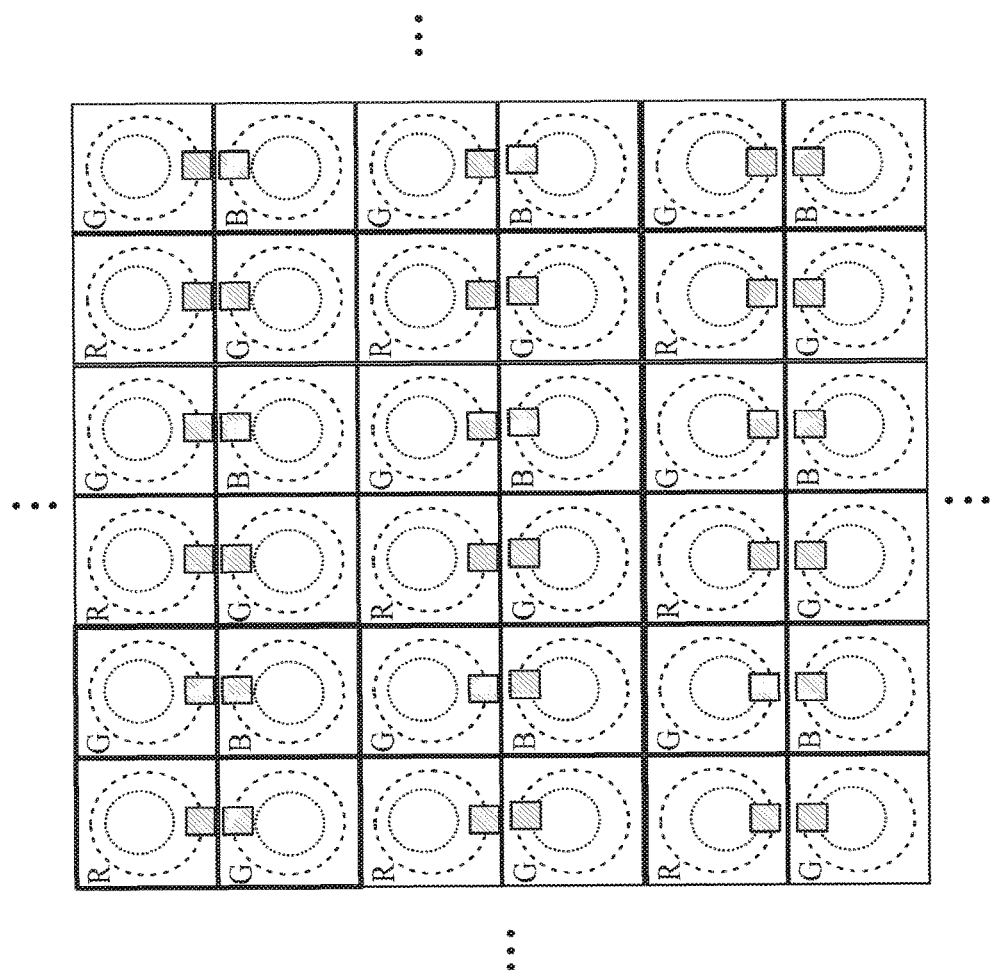
FIGS. 13-15 illustrate additional layouts of an imaging array according to other embodiments of the present invention.
Figure 14:
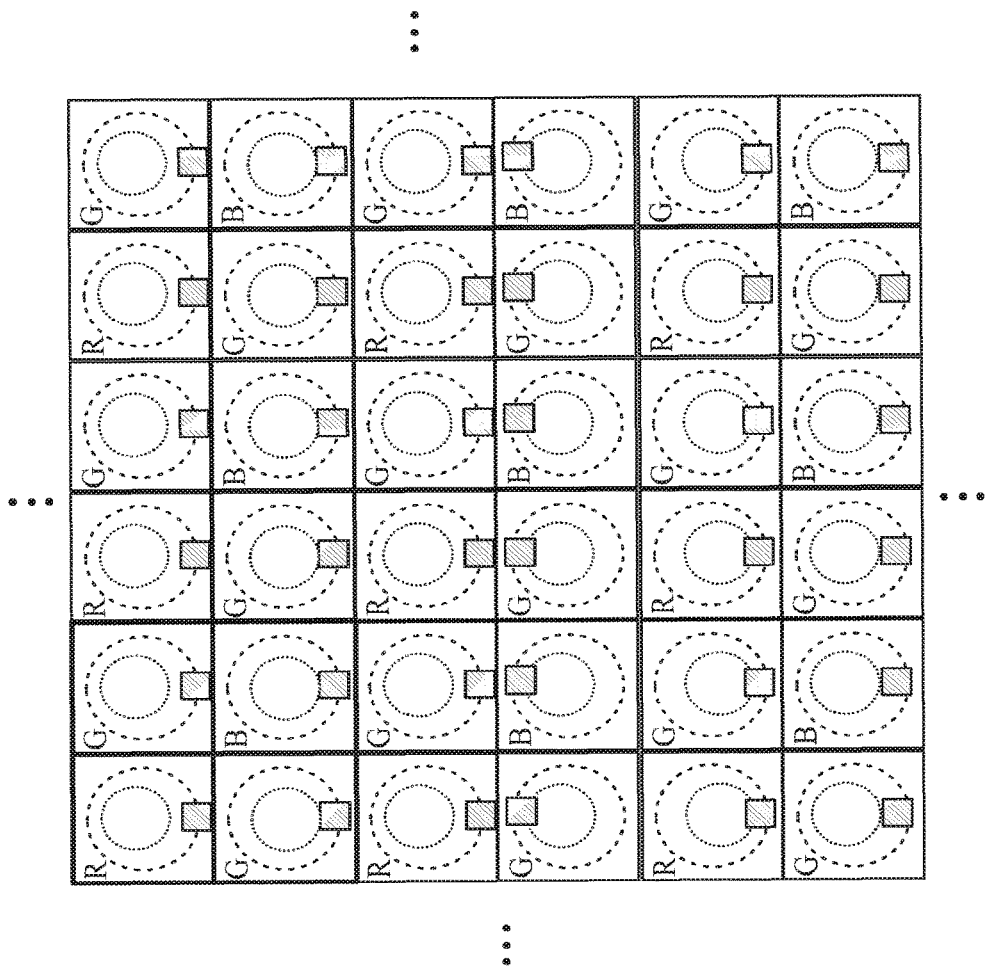
Figure 15:
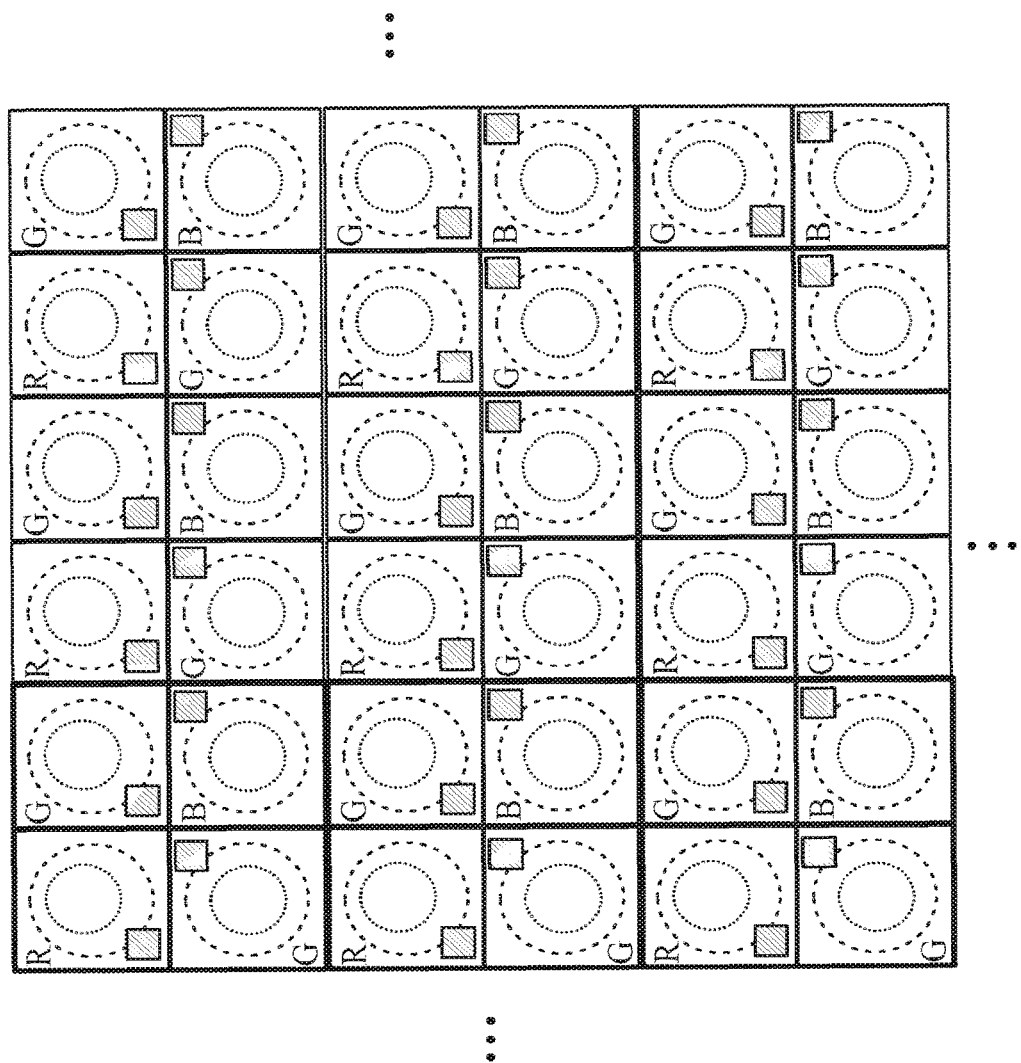

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims. FIGS. 13-15 illustrate three other possible embodiments. Any arrangement in which the autofocus photodiodes form two linear arrays with each linear array preferentially receiving light from one side of the microlens can, in principle, be used.

What is claimed is:

1. An apparatus comprising a two dimensional array of pixel sensors, each pixel sensor comprising:
   a main photodiode;
   an autofocus photodiode; and
   a microlens that concentrates light onto said main photodiode and said autofocus photodiode,
   said two-dimensional array of pixel sensors comprising first and second autofocus arrays of pixel sensors, said pixel sensors in said first autofocus array of pixel sensors having said autofocus photodiode positioned such that each autofocus photodiode receives light preferentially from one half of said microlens in that pixel sensor and said pixel sensors in said second autofocus array of pixel sensors having each autofocus photodiode positioned such that each autofocus photodiode receives light preferentially from said other half of said microlens in that pixel sensor.

2. The apparatus of claim 1 wherein said autofocus photodiode comprises a pinned photodiode.

3. The apparatus of claim 2 wherein said main photodiode is characterized by a main photodiode area and said pinned photodiode is characterized by a pinned photodiode area, said main photodiode area being greater than said pinned photodiode area.

4. The apparatus of claim 1 wherein said autofocus photodiode comprises a parasitic photodiode associated with a floating diffusion node in each of said pixel sensors.

5. The apparatus of claim 1 wherein said pixel sensors in said first autofocus array of pixel sensors having autofocus photodiodes positioned such that each autofocus photodiode receives more than 80 percent of said light from one half of said microlens in that pixel sensor and said pixel sensors in said second autofocus array of pixel sensors having autofocus photodiodes positioned such that each autofocus photodiode receives light preferentially from said other half of said microlens in that pixel sensor.

6. The apparatus of claim 1 wherein said pixel sensors in said first autofocus array of pixel sensors having autofocus photodiodes positioned such that each autofocus photodiode receives more than 90 percent of said light from one half of said microlens in that pixel sensor and said pixel sensors in said second autofocus array of pixel sensors having autofocus photodiodes positioned such that each autofocus photodiode receives light preferentially from said other half of said microlens in that pixel sensor.

7. The apparatus of claim 1 further comprising
   a camera lens that images a scene to be photographed onto said two dimensional array of pixel sensors;
   an actuator that moves said camera lens relative to said two-dimensional imaging array in response to an autofocus signal from a controller, said controller being configured
   to cause said pixel sensors to be exposed to light from a scene to be photographed for an autofocus period of time;
   to obtain signals from each of said pixel sensors in said first and second autofocus arrays of pixel sensors indicative of an amount of light received during said autofocus period of time; and
   to generate said autofocus signal such that a predetermined portion of said scene will be in focus on a predetermined region of said two dimensional array of pixel sensors.

8. The apparatus of claim 7 wherein generating said autofocus signal comprises computing a cross-correlation function of signals from said autofocus photodiodes in said first autofocus array of pixel sensors with a signal from said autofocus photodiodes in said second autofocus arrays of pixel sensors.

9. The apparatus of claim 7 wherein said main photodiodes of said pixel sensors in said two-dimensional array of pixel sensors are organized as a uniform array with equal spacing in each dimension of said two dimension array, and wherein said autofocus photodiodes form a non-uniform array.

10. The apparatus of claim 9 wherein said first autofocus arrays of pixel sensors is a mirror image of said second autofocus array of pixel sensors.

11. The apparatus of claim 7 wherein said controller generates a first image of said scene using said main photodiodes in said two-dimensional array of pixel sensors including said first and second autofocus arrays of pixel sensors.

12. The apparatus of claim 1 wherein said first autofocus array of pixel sensors comprises a first linear array of said pixel sensors and said second autofocus array of pixel sensors comprises a second linear array of said pixel sensors configured as a mirror image of said first linear array of pixel sensors.

13. The apparatus of claim 1 wherein said pixel sensors comprise a plurality of color filters of different colors, one of said plurality of color filters being disposed under said microlens in each of said two-dimensional array of pixel sensors, said first autofocus array being characterized by a first number of color filters of each color contained in said first autofocus array of pixel sensors and said second autofocus array being characterized by a second number of color filters of each color contained in said second autofocus array of pixel sensors, said first and second numbers being substantially equal.

14. The apparatus of claim 11 wherein said controller outputs a light intensity measurement determined from said autofocus photodiodes in each of said pixel sensors together with said first image.

* * * * *